UNITED STATES PATENT OFFICE.

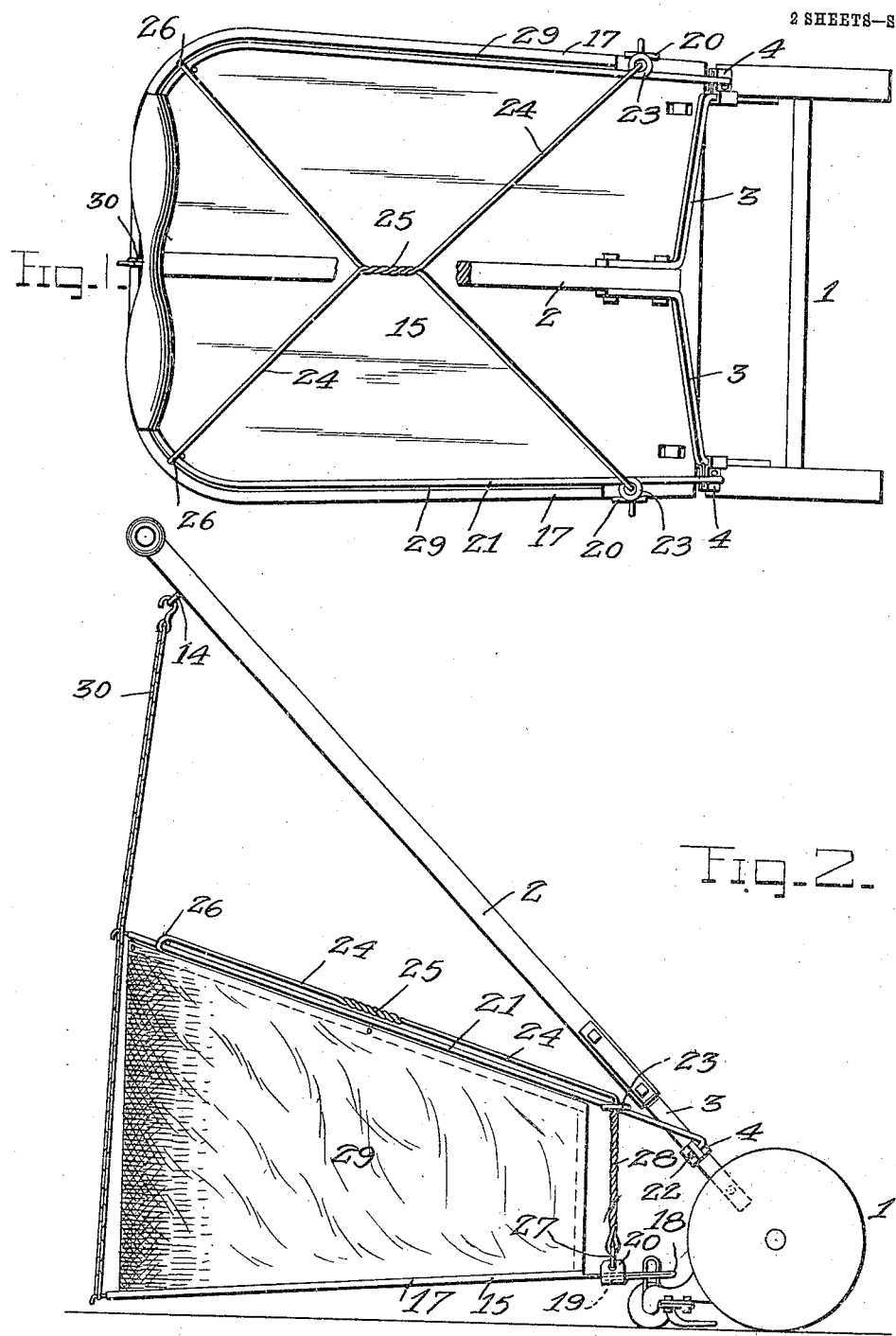

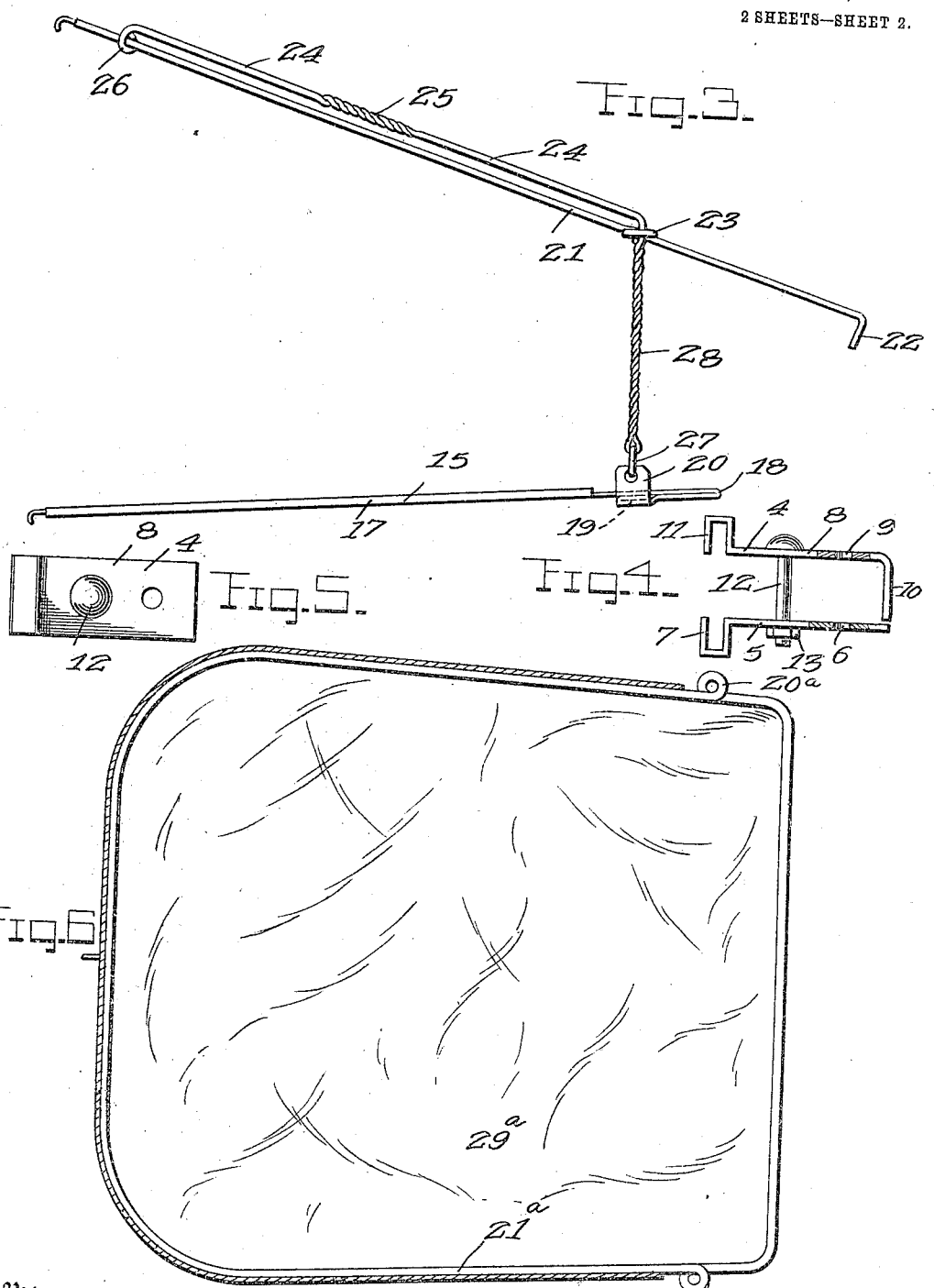

FRANK CLEMENS, JR., OF CRESTLINE, OHIO.

GRASS-CATCHER FOR LAWN-MOWERS.

952,308.

Specification of Letters Patent. Patented Mar. 15, 1910.

Application filed July 26, 1909. Serial No. 509,596.

*To all whom it may concern:*

Be it known that I, FRANK CLEMENS, Jr., citizen of the United States, residing at Crestline, in the county of Crawford and State of Ohio, have invented certain new and useful Improvements in Grass-Catchers for Lawn-Mowers, of which the following is a specification.

My invention relates to grass catchers or collectors for application to and use in combination with lawn mowers and the like; and it contemplates the provision of a grass catcher of simple, light and inexpensive construction, and one adapted to be expeditiously and easily attached to lawn mowers such as at present in general use, and also well adapted to withstand the usage to which such devices are ordinarily subjected.

The invention will be fully understood from the following description and claims when the same are read in connection with the drawings, accompanying and forming part of this specification, in which:

Figure 1 is a broken plan view showing a lawn mower equipped with a grass catcher constructed in accordance with my invention. Fig. 2 is a side elevation of the same. Fig. 3 is a side elevation of the frame of the catcher. Figs. 4 and 5 are a side view and a plan view, respectively, of one of the clips employed in connecting the front portion of the catcher to the mower frame. Fig. 6 is a plan view of a modification hereinafter referred to in detail.

Similar numerals designate corresponding parts in all of the views of the drawings, referring to which:

1 is a lawn mower having the usual handle 2 and divergent arms 3 at the forward end of the handle, and 4, 4 are the novel clips which I employ in the coupling of the forward portion of the catcher frame to the mower. The said clips are identical in construction and, therefore, a detailed description of the one shown in Figs. 4 and 5 will suffice to impart a definite understanding of both. It will be seen by reference to the said figures that the clip comprises a lower sheet-metal member 5, apertured at 6, and having a lip 7, an upper sheet-metal member 8, apertured at 9 and having a flange 10 at one end, adapted to meet the member 5, and also having a lip 11 at its opposite end, and a bolt 12 and nut 13 connecting the members 5 and 8 together. Obviously clips of the description stated are adapted to be readily fixed on the mower portions 3; the opposed lips 7 and 11 receiving the said portions 3 and being firmly clamped thereon by the bolts and nuts referred to. When the clips are applied as set forth, the apertures 6 and 9 are vertically disposed and alined and hence are adapted to receive and safely hold the hooks of the catcher frame hereinafter described.

On the underside of the rear portion of the mower handle 2 an eye 14, Fig. 2, is provided for a purpose presently set forth.

15, Figs. 1 and 3, is the bottom of the novel grass-catcher. The said bottom 15 is made of a single piece of thin sheet-metal in the configuration illustrated; the rear portion of said piece being bent inwardly and upon itself to form an edge flange 17, and the bottom being carried forwardly beyond the flange 17, and being there bent or lapped downwardly and rearwardly, as indicated by 18, after which it is bent or lapped upwardly and forwardly upon itself, as indicated by 19. In this manner the forward portion of the bottom 15 is given increased weight and is stiffened and strengthened. It will also be seen that the thickness of sheet-metal below the terminal portion 19 is provided with two upwardly extending and apertured ears 20.

21 is the upper frame of the catcher which is preferably in the form of a bar, as shown. The said upper frame or top bar is preferably a piece of wire bent into the configuration shown in Fig. 1; and it is provided at its ends with hooks 22, designed to be seated in the before described apertures 9 and 6 of the clips 4. It will also be observed that the side portions of the upper bar 21 are bent at forward points to form loops 23 for the connection of braces 24 which latter are twisted about each other at a point 25 below the handle 2 of the mower. From this it follows that the said twisted portions of the braces 24 may be used as a hand-grasp and in that way contribute to the facility with which the catcher may be handled as a unit. The rear portions of the braces 24 are twisted about or otherwise connected to the rear portion of the top bar 21, as indicated by 26; and in the preferred embodiment of my invention, the forward portions of the braces are carried downwardly through the said loops 23 of the top bar 21 and through links 27 by which they are connected with the bottom ears 20, after which they are twisted and carried upwardly to the top bar 21. In this way arms 28, one of which is shown in Fig. 3, are formed and the frame of the grass catcher is completed.

In addition to the frame referred to, the grass catcher comprises sides 29 and a back, formed of a single piece of canvas or other textile or flexible material. The lower edge of the said piece of canvas is fastened in a seam or otherwise around the edge of the bottom 15, and is seamed over or otherwise fastened to the top bar 21.

30 is a cable support, preferably in the form of a chain, which is fastened at its lower end to the rear end of the bottom 15, and at an intermediate point of its length to the rear portion of the top bar 21, and is then carried upwardly to the before mentioned eye 14 and attached thereto.

It will be gathered from the foregoing that when it is desired to remove the catcher from the mower, it is simply necessary to unhook the chain 30 from the eye 14 and withdraw the hooks 22 from the clips 4. It will also be noted that the catcher is attached to the handle above the mower; that the chain support 30 takes the weight off the canvas 29; that the catcher may be nicely adjusted to the mower by bending the hooks 22 up or down and by bending the arms 28 forwardly or backwardly, and adjusting the chain support 30, as occasion requires; and that the clips 4 and eye 14 may be readily applied to the handles of different types of mowers.

When desired, the bottom of the catcher may be formed of canvas $29^a$ suitably attached to a wire frame $21^a$, such as shown in Fig. 6; the said wire frame having eyes $20^a$ in its side portions for the connection of arms 28 similar to those before described. It will also be obvious that in the future practice of the invention, other modifications may be made that do not depart from the scope of my invention as defined in the claims appended.

Having described my invention, what I claim and desire to secure by Letters Patent, is:—

1. A grass catcher for lawn-mowers, comprising a top frame, a bottom connected therewith, braces connected at spaced points to each of the side portions of the top frame and having intermediate portions twisted about each other, means for attaching the top frame to a mower handle, and means for suspending the rear portion of the bottom from the mower handle.

2. In a grass-catcher for lawn mowers, the combination of apertured clips adapted for connection to the front portions of a mower handle, a bottom, a top frame connected with the bottom and having hooks seated in the apertures of the clips, a support connected to the bottom and the top frame and extended above the latter for connection with the rear portion of the mower handle, and braces connected to the side portions of the top frame and having intermediate portions twisted about each other forming a handle.

3. A grass-catcher for lawn-mowers, comprising a top frame having hooks, a bottom connected with the top frame, means for receiving said hooks, adapted for connection to a mower handle, braces connected to the top frame and connected together and forming a handle, and a support connected to the bottom and the top frame and adapted for connection to the mower handle.

4. A grass-catcher for lawn mowers, comprising a top frame having bendable forward portions, a bottom, flexible material connecting the top frame and the bottom, braces extending between and connecting the side portions of the top frame together and extending downwardly from said side portions and forming bendable arms directly connected to the bottom, means for attaching the top frame to a mower handle, and means for suspending the rear portion of the bottom from the mower handle.

5. In a grass-catcher for lawn mowers, the combination of a clip comprising members having at adjacent ends outwardly extending opposed lips for engagement with a mower handle, one of said members also having an aperture, and the other member having an angular flange extending to the inner side of the other member and also having an aperture, means for connecting the members to said handle, a bottom, a top frame connected with the bottom and having hooks seated in the apertures of said members, and a support connected to the bottom and the top frame and extended above the latter for connection with the mower handle.

6. A grass-catcher for lawn-mowers, comprising a top frame, a sheet-metal bottom having its forward portion turned over on itself and also having integral ears on said forward portion, arms connecting said ears with the top frame, means connected to the top frame and the bottom and closing the sides and the rear end of the catcher, means for attaching the top frame to a mower handle, and means for suspending the rear portion of the bottom from said handle.

In testimony whereof I affix my signature in presence of two witnesses.

FRANK CLEMENS, Jr.

Witnesses:
Wm. C. Marquart,
A. Seib.